INVENTORS
CHARLES R. GRACE
JACK D. SMITH
BY *Irvin L. Groh*
ATTORNEY.

United States Patent Office 2,981,854
Patented Apr. 25, 1961

2,981,854
ELECTRIC FENCE CHARGER

Charles R. Grace and Jack D. Smith, Shiawassee County, Mich., assignors to Smith-Fisher, Incorporated, Owosso, Mich., a corporation of Michigan Filed Jan. 12, 1959, Ser. No. 786,279

5 Claims. (Cl. 307—132)

This invention relates to electric fences and more particularly to electric fences which are supplied with intermittent pulses of electric energy.

To operate satisfactorily, an electric fence must effectively repel animals under all conditions. It has been determined that the factors having the greatest influence on the operation of electric fences are changes in weather and moisture content of the ground. These changes in turn result in a variation in the voltage requirements of a fence system. For example, satisfactory operation is obtained with low voltage under wet conditions. However, under extremely dry conditions, a low voltage fence may not have sufficient shocking power to repel animals. On the other hand, a high voltage fence is usually satisfactory in dry conditions but of little effect when ground and weather conditions are extremely wet.

Systems which attempt to solve the problem of changing weather conditions rely on means for varying the voltage as the need arises. However, such arrangements require a fairly constant observation of conditions so that the required manual adjustments may be made promptly as the change occurs. Furthermore, the arrangements are undesirable, particularly at lower voltages, since the available current is relatively large and may be dangerous if applied to the fence continously. For this reason, it is necessary that charges be available at the fence for brief periods only. It is common practice to provide for a shock period of about one-tenth of each second of operation to permit voluntary release from the fence in the intervals between shock periods. Unfortunately, the controllers used for regulating the shock periods are subject to failure which frequently results in a continuous, dangerous current being available at the fence.

It is a general object of the invention to provide an improved electric fence which is effective to repel animals under varying weather and ground conditions.

A further object of the invention is to provide an electric fence which maintains an electric charger at the fence sufficient to repel animals under a full range of weather conditions without requiring manual adjustment or periodic observation.

Another object of the invention is to provide an improved system of energising a fence wherein the fence wire is continuously and alternately charged with high and low voltage surges; thus enhancing the effectiveness of the fence under the wide range of weather and ground conditions extending between the extremes of wet and dry.

Additionally, it is an object of the invention to provide an electric fence charger so constructed and arranged that failure of any of the components or improper positioning of the charger will not result in a continuous, dangerous electrical charge at the fence.

The foregoing and other objects and advantages are attained by the present invention, various novel features of which will be apparent from the following description and from the accompanying drawings disclosing a preferred embodiment of the invention.

Referring to the drawings:

Fig. 1 diagrammatically illustrates an electric fence system embodying the invention;

Figure 1:
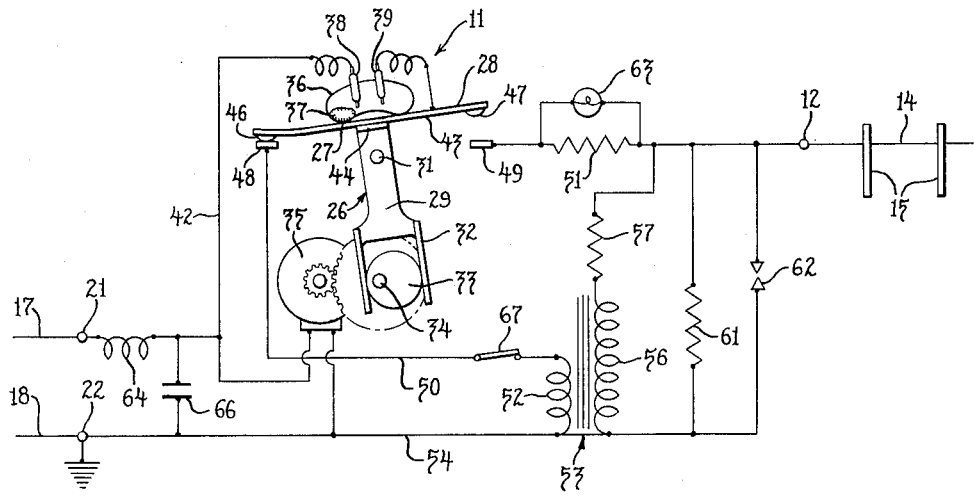

Referring first to Fig. 1, a fence charger 11 includes an output terminal 12 connected to a bare conductive type of fence wire 14 supported on the usual fence posts 15.

The lines 17 and 18 of an alternating current source of supply such as the standard 110 volt, 60 cycle household supply, of which line 18 is the grounded neutral, are connected to the input terminals 21 and 22 of the fence charger 11, terminal 22 of which may be grounded as shown.

The function of the charger is to deliver periodic impulses of current at regular intervals to the output terminal 12. The impulses are alternately at a high voltage and a low voltage, that is, a high voltage charge is supplied for a fraction of a second during one interval and a low voltage charge is supplied for a fraction of a second during the next interval.

Means for controlling the period of the charges and for alternating the charges between high and low voltages are in the form of a controller 26 which includes a mercury switch 27 and a circuit distributor 28, both mounted on a control or rocker arm 29 which is supported on a pivot 31. The lower part of the control arm has a channel shaped portion 32 which is engaged by a cam wheel 33 rotatable with a shaft 34 driven through gearing by a synchronous motor 35 powered by the source of electric energy available at the terminals 21 and 22. The arrangement is such that the cam 33 rotates continuously at approximately 30 r.p.m. and rocks the arm 29 between limits determined by the cam.

The mercury switch 27 comprises a slightly curved glass tube 36 containing a mass of mercury 37. A pair of spaced insulated terminals 38 and 39 project into the tube at a point intermediate its ends and the inner ends 41 of the terminals are exposed to form switch contacts which are simultaneously bridged by the mercury 37 as it moves from one end of the tube to the other during rocking movement caused by swinging movement of the lever 29. The high bottom portion within the curved tube 36 acts to delay movement of the mercury and hold it in one end of the tube away from the contacts 41 until the lever 29 swings a substantial distance beyond its vertical position. Consequently, the mercury moves rapidly from a position of rest at one end of the tube to a position of rest at the other end and the contacts 41 are bridged for a very short period of time as the mercury falls past the central portion of the tube. The bridging occurs for approximately one-tenth of a second although the mercury moves the full length of the tube once each second.

One of the terminals 38 of the mercury switch is connected through a wire 42 to the input terminal 21 and the other terminal 39 is connected to the distributor 28. During rotation of the cam wheel 33 at the rate of 30 revolutions per minute, the contacts 41 are bridged once each second to connect the input terminal 21 to the distributor 28.

The distributor 28 comprises an elongated flexible arm element 43 which acts as a conductor. An intermediate portion of the arm 43 is fastened to the upper end 44 of the control arm 29 and opposite ends of the arm 43 are provided with contact elements 46 and 47 which are adapted to engage and disengage with associated fixed contact elements 48 and 49 during swinging movement of lever 29.

As the rocker arm 29 moves about pivot 31, the intermediate portion of the distributor arm 43 moves in an arc and the entire arm tilts so that the motion may be considered as rocking movement about the pivot 31. During such movement the moving contacts 46 and 47 alternately engage the fixed contacts 48 and 49. The arm element 43 of the distributor 28 is flexible so that the period for which the corresponding contacts 46 and 48 or 47 and 49 are engaged is longer than the period during which the switch contacts 41 are bridged by the mercury 37. For example, when the upper end 44 of the control arm moves to the right from the position shown in Fig. 1, the distributor arm 43 also moves to the right and contact 46 disengages fixed contact 48. When control arm 29 reaches a vertical position, distributor arm 43 is in a horizontal position and both of the contacts 46 and 47 are disengaged from their corresponding fixed contacts. At this point the mercury 37 remains at rest at the left end of the glass tube 36 and continued movement of the control arm to the right results in engagement of the contact 47 with contact 49 before the extreme right position is reached. Such engagement causes the distributor arm 43 to bend and as the upper end of the control arm reaches its extreme right position, the mercury 37 moves rapidly from left to right and briefly bridges the contacts 41. As the upper end 44 returns to the left, contact 47 and 49 remain engaged until sufficient movement of the control arm permits the distributor arm to become straight. Subsequently the contacts 47 and 48 disengage. In this manner each pair of contacts 46 and 48 and 47 and 49 are in engagement for a period of time which begins before and ends after the one-tenth second period that the switch contacts 41 are engaged by the mercury 37. This prevents arcing at the contacts 46–49 since a complete circuit will be interrupted within the evacuated glass tube of the mercury switch 27.

The stationary contact 49 is connected through a fixed resistance 51 to the output terminal 12 of the controller 11 and the other contact 48 is connected through a line 50 to one end of a primary coil 52 of a step-up transformer 53. The other end of the primary is connected through a line 54 to the input terminal 22. The secondary coil 56 of the transformer has one end connected to line 54 and the other end connected through a fixed resistance 57 to the fence or output terminal 12.

As the distributor member 28 rocks and contact 47 engages contact 49, a one-tenth second impulse of relatively low voltage electric energy is made available at the output terminal 12 through the current limiting resistor 51. As the contact 46 engages contact 48, a one-tenth second relatively high voltage impulse is made available at the terminal 12 through the transformer 53 and the current limiting resistor 57. The step-up transformer 53 is effective to increase the line voltage from 110 volts to approximately 2,500 volts and the resistances 51 and 57 are of a value effective to limit the available current at the output terminal 12 to a safe value. In the illustrated embodiment of the invention shown in Fig. 1, the current limiting resistances 51 and 57 have values of 220 ohms and 15,000 ohms, respectively.

A resistance 61 is shunted across the secondary transformer winding 56 to prevent transient voltages from appearing in the output and across the transformer. A spark gap is indicated at 62 to protect the transformer from transients resulting from lightning discharges in the vicinity of the fence wire.

A small pilot lamp 63 is shunted across the resistance 51 to indicate when the fence wire is accidentally grounded or shorted and consequently of no effect to repel animals. At such times the lamp emits a light and serves as a warning that the fence requires inspection and may require repair.

A choke coil 64 in the line 42 between the terminal 21 and the mercury switch and a capacitor 66 across the lines 17 and 18 form a filter arrangement to eliminate interference with radio reception which might be encountered when the mercury switch 27 interrupts the power circuit.

When contacts 46 and 48 are closed, a high potential charging circuit is established through mercury switch 27, distributor arm 43, contacts 46 and 48, transformer 53 and resistance 57 so that when an animal contacts the wire 14, a circuit is completed back to the ground terminal 22. When contacts 47 and 49 are closed, a low potential charging circuit is established through the mercury switch 27, distributor arm 43 and resistance 51 so that animal contact with wire 14 completes the circuit through the ground to the ground terminal 22.

Although reference is made to circuits, such circuits are normally open and three conditions must be satisfied simultaneously to form a closed circuit for the flow of current. One of the contacts 46 or 47 must be engaged with its corresponding fixed contact 48 or 49, the contacts 41 must be bridged by the mercury 31 and an animal must be in contact with the fence wire 14 and ground.

Figure 2:
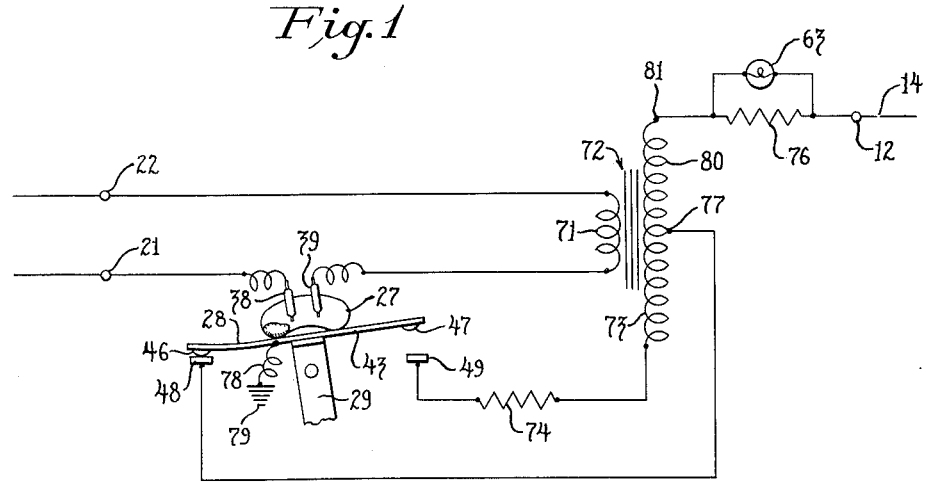
Fig. 2 is a diagrammatic illustration of a second embodiment of the invention.

In the embodiment illustrated in Fig. 2, the same reference characters have been used to identify parts identical to those in Fig. 1. In this embodiment, however, the input terminals 21 and 22 are connected to opposite ends of the primary winding 71 of a transformer 72 and the mercury switch 27 has its terminals 38 and 39 connected to one of the lines to interrupt the circuit including the primary winding. The contact 49 is connected to one end of the secondary winding 73 through a current limiting resistance 74. The other end of the secondary winding 73 is connected through a current limiting resistance 76 to the output terminal 12. The other contact 48 is connected to an intermediate tap 77 on the secondary winding 73. The distributor arm 43 is connected by a wire 78 to a ground connection indicated at 79.

As the arm rocks, the mercury switch is closed in the usual manner and a circuit is completed through the primary winding 71.

When contacts 46 and 47 are engaged, a charging circuit is completed which included the portion 80 of the secondary winding 73 between the intermediate tap 77 and the end 81. The remainder of the charging circuit includes the resistance 76, the terminal 12, and the fence wire 14, and current therefrom passes through an animal contacting the wire, through the ground to the ground connection 79 which is connected by wire 78 to the distributor arm 43. When contacts 47 and 49 are engaged, a charging circuit is established between the ground connection 79, through the distributor arm 43, contacts 47 and 49, current limiting resistance 74, the entire secondary winding 73, the resistance 76, wire 14 and through an animal to the ground.

In the embodiment shown in Fig. 2, the coils in the primary and secondary are such that a 110 volt supply on the primary results in 250 volts when contacts 46 and 48 are closed to form a low potential circuit and 1,000 volts when contacts 47 and 49 are closed to form a high potential circuit. To safely limit the current, it has been found practical to give resistance 74 a value of approximately 25,000 ohms and resistance 76 a value of approximately 250 ohms.

The operation of the distributor 28 and mercury switch 27 result in alternate high and low voltage charges being made available at the fence wire in much the same manner as in the embodiment shown in Fig. 1. One advantage of the second embodiment is that care need not be exercised in connecting the terminals 21 and 22 to the alternating current source, that is, the hot wire may be connected to either terminal. In the first embodiment, however, terminal 21 must be connected to the hot side of the alternating current supply.

Electric fences of the high voltage type are effective under dry conditions but under wet conditions weeds and grass in contact with the fence wire and the wet insulators and posts cause current leakage which may make it possible for an animal to contact the fence without receiving a repelling shock. On the other hand, fence chargers of the low voltage type are effective when the ground and fence is wet. Under such conditions the animal makes good contact with the ground and the various leakages which occur are not of serious consequences since greater current is available. However, under extremely dry conditions it is very difficult to make good contact with the ground and since the voltage is relatively low, an animal will receive little or no shock.

Figure 3:
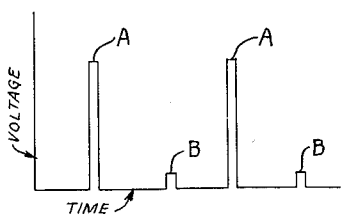
Fig. 3 shows diagrammatically the form of the voltage output of the arrangements in Figs. 1 and 2.

In the present arrangements, the alternate high and low voltage pulses accommodate the full range of weather and ground conditions so that an animal contacting the fence will receive a shock effective to repel it. With the control mechanism shown, a single impulse of one-tenth second duration is imposed on the fence wire 14 each second. Every other impulse is from the same voltage source. Consequently, if an animal contacts the fence under extremely dry conditions, the animal will receive a shock at least every two seconds. The shock will be by way of the high voltage system and the low voltage system will have little, if any, effect. Under wet conditions, the shock period will occur at least once every two seconds because of the effectiveness of the low voltage system and possible ineffectiveness of the high voltage system. Under average conditions, an animal remaining in contact with the wire 14 will sense a shock once each second. The net result of such operation is that under moderate or average weather and ground conditions, the effective shocking period will occur each second and under extreme conditions the period will occur at least once every two seconds. Consequently, the fence is effective to repel animals under all conditions without requiring manual adjustment to vary voltages. The form of the voltage available at the fence will be more readily visualized by making reference to Fig. 3 in which the ordinate represents voltage and the abscissa represents time. The relatively high voltages indicated at A represent the available potential when the distributor contacts 46 and 48 are engaged and the relatively low voltages indicated at B represent the available potential due to engagement of contacts 47 and 49.

A switch 67 may be located in the line 50 from contact 48 to interrupt the line to the primary winding 52. When this is done high voltage is not available at the fence and the low voltage system will be effective at the output 12 of the controller once every two seconds. By using the switch, the charger remains in operation to repel animals and yet by using simple precautions such as gloves or insulated shoes, a person can make repairs or alter the location of the fence without receiving shock. A similar switch may be incorporated between the contact 49 and resistance 74 in the arrangement shown in Fig. 2.

In both of the described embodiments of the invention the controller formed by the mercury switch and distributor are so arranged that it is impossible for a continous charge to be delivered to the fence. For example, if the rotation of cam 33 should stop, there is no fixed position of the distributor member 28 or the switch 27 at which the power line between terminals 12 and 21 can be closed. In a fixed, horizontal position of the distributor arm 46, it is very improbable that the mercury 37 can be maintained in contact with both switch contacts 41. Furthermore, such bridging of the contacts would not close the power line since both of the movable contacts 46 and 47 would be spaced from the corresponding fixed contacts 48 and 49. On the other hand, if the arm 29 is tilted from the horizontal position, the mercury 37 will remain at one of the ends of the glass tube 36 so that contacts 41 form a break in the power line. Furthermore, if the controller 26 is accidentally inverted, it is not possible for contacts 41 to be bridged since terminals 38 and 39 are insulated and the exposed contact portions 41 within the tube 36 would extend above the pool of mercury. If the tube is inverted, only the insulated portions of the terminals 38 and 39 can be bridged.

From the above, it will be seen that an improved electric fence system has been provided by which a conductive fence wire is charged intermittently and alternately with high voltage and low voltage pulses so that changes in weather and ground conditions do not limit the effectiveness of the fence, that is, a shocking impulse will be available for the full range of conditions between wet and dry and no special attention or adjustment of the charger is required. Furthermore, the results are obtained through means of an exceedingly simple circuit interrupter and distributor arrangement which makes it impossible for a continuous charge to be made available at the fence.

It should be understood that it is not intended to limit the invention to the above described forms and details, and that the invention includes such other forms and modifications as are embraced by the scope of the appended claims.

It is claimed and desired to secure by Letters Patent:

1. In an electric fence charger, the combination of a normally open high potential circuit, a normally open low potential circuit, distributor means for selecting said circuits alternately and periodically, said distributor means including an elongated conductor mounted to rock about a point intermediate its opposite ends, said conductor having a pair of contact portions at its opposite ends for alternately engaging and completing said high and low potential circuits, respectively, a source of power for energizing said circuits, a normally open switch means connected to said source for interrupting the latter, said switch means being supported on said conductor for rocking movement therewith, said switch means being closeable periodically in response to each closing movement of said distributor.

2. In an electric fence charger having an output terminal adapted for connection to a fence wire, the combination of a high potential circuit and a low potential circuit connected to said terminal, a pair of distributor switches disposed in said high and low potential circuits, respectively, a distributor member being movable between a position in which one of said switch means is closed while the other of said switch means is open, a source of power for supplying said circuits, means for moving said distributor at a regular rate, a normally open control switch being disposed between said source of power and said circuits and being supported on said distributor member for closing in response of movement of the latter each time one of said distributor switches is closed.

3. In an electric fence charger for charging a bare conductive fence wire, the combination of a high voltage charging circuit including a pair of normally open contacts, a low voltage charging circuit including a pair of normally open contacts, one contact of each pair being connected to said output terminal, a flexible conductor member having opposite ends connected to the other contact of each pair of contacts, said distributor member being supported intermediate its ends for rocking movement in opposite directions from an intermediate position in which both pairs of contacts are disengaged to a position in which one pair of contacts is engaged and the adjacent end of said distributor member is deflected to maintain the contacts engaged during movement of said member and a position in which the other pair of contacts is engaged and the adjacent end of said member is deflected to maintain the contacts engaged during movement of said member, said member forming a part of said circuits, a power source for supplying voltage to said circuits, a control switch interrupting said power source and supported on said member for rocking movement therewith, said switch being closeable in response to movement of said member only during the interval that the ends of said member are deflected.

4. An electric fence charging device comprising a source of voltage, an output terminal adapted for connection to a fence wire, a low voltage circuit and a high voltage circuit connected to said terminal, means intermittently and alternately operatively connecting said circuits to said source comprising a motor operated rocker arm oscillating between two positions, a flexible and electrically conductive distributor member mounted on said rocker arm and alternately connected to each of said circuits for a relatively long interval of time only when said rocker arm is in one of said positions, a mercury switch connected between said source and said distributor, said mercury switch being mounted on said rocker arm and being constructed and arranged to close momentarily only when said rocker arm reaches either of said positions and during said interval when said distributor is connected to one of said circuits.

5. An electric fence charging device comprising input terminals adapted for connection to a source of voltage and an output terminal adapted for connection to a fence wire, a first circuit and a second circuit connected to said output terminal for respectively supplying relatively low and high voltages thereto, and means intermittently and sequentially connecting said first and second circuits to said source, said means comprising a motor operated rocker arm oscillating between two positions, a mercury switch mounted on said rocker arm and constructed and arranged to be momentarily closed upon said rocker arm being moved to either of said positions from which the other of said positions, and a distributor movable with said rocker arm and having first and second contacts operatively connected to said source through said mercury switch, a first stationary contact for said first circuit engaged by said first movable contact as said rocker arm approaches and reaches one of said positions, and a second stationary contact for said second circuit engaged by said second movable contact as said rocker arm approaches and reaches the other of said positions so that each pair of said contacts is alternately closed by said rocker arm and remains closed during closing and opening operation of said mercury switch.

No references cited.